United States Patent
Chandra et al.

(10) Patent No.: US 12,101,642 B1
(45) Date of Patent: Sep. 24, 2024

(54) SYSTEMS AND METHODS FOR UPDATING PREFERRED NODES LISTS FOR WIRELESS DEVICES IN A WIRELESS NETWORK

(71) Applicant: Sprint Spectrum LP, Overland Park, KS (US)

(72) Inventors: Amrit Kumar Chandra, Ashburn, VA (US); Charles Manganiello, Paola, KS (US); David Zhijun Sun, Broadlands, VA (US); Jay R. Chernoff, Pawleys Island, SC (US); Kristian Kai Johns, Ashburn, VA (US); Liang Li, Darnestown, MD (US); Mayur Shirwadkar, Arlington, VA (US); Neehar Kulkarni, Herndon, VA (US)

(73) Assignee: Sprint Spectrum LP, Overland Park, KS (US)

( * ) Notice: Subject to any disclaimer, the term of this patent is extended or adjusted under 35 U.S.C. 154(b) by 801 days.

(21) Appl. No.: 16/688,132

(22) Filed: Nov. 19, 2019

(51) Int. Cl.
| | |
|---|---|
| *H04W 16/18* | (2009.01) |
| *H04B 17/327* | (2015.01) |
| *H04B 17/336* | (2015.01) |
| *H04L 41/0853* | (2022.01) |
| *H04L 41/12* | (2022.01) |
| *H04L 41/14* | (2022.01) |

(Continued)

(52) U.S. Cl.
CPC .......... *H04W 16/18* (2013.01); *H04B 17/327* (2015.01); *H04B 17/336* (2015.01); *H04L 41/0853* (2013.01); *H04L 41/12* (2013.01); *H04L 41/14* (2013.01); *H04W 40/248* (2013.01); *H04W 72/542* (2023.01); *H04W 76/27* (2018.02)

(58) Field of Classification Search
CPC . H04W 16/18; H04W 40/248; H04W 72/085; H04W 76/27; H04B 17/327; H04B 17/336; H04L 41/0853; H04L 41/12; H04L 41/14
See application file for complete search history.

(56) References Cited

U.S. PATENT DOCUMENTS

| | | |
|---|---|---|
| 8,897,264 B2 | 11/2014 | Samdanis |
| 8,923,871 B2 | 12/2014 | Aminaka et al. |

(Continued)

FOREIGN PATENT DOCUMENTS

| | | | | |
|---|---|---|---|---|
| WO | WO2020247644 A1 | * | 12/2020 | ............ H04W 24/02 |

*Primary Examiner* — Harry H Kim
*Assistant Examiner* — Mohammed M Murshid
(74) *Attorney, Agent, or Firm* — Jones Robb, PLLC

(57) ABSTRACT

A system for updating a preferred nodes list for a wireless device in a wireless network includes a server in communication with a plurality of nodes each configured to deploy a radio air interface to provide wireless services to wireless devices. The server includes a processor configured to instruct, in response to a trigger, a first node to send a message to a wireless device connected to the first node. The message instructs the wireless device to contact the server for an updated preferred nodes list. The processor receives a request for the updated preferred nodes list from the wireless device and provides the updated preferred nodes list to the wireless device. The updated preferred nodes list enables the wireless device to change from connecting to the first node included in the preferred nodes list to connecting to a second node included in the updated preferred nodes list.

18 Claims, 7 Drawing Sheets

(51) Int. Cl.
    *H04W 40/24*     (2009.01)
    *H04W 72/542*     (2023.01)
    *H04W 76/27*     (2018.01)

(56) References Cited

U.S. PATENT DOCUMENTS

| | | | |
|---|---|---|---|
| 9,264,960 B1* | 2/2016 | Tailor | H04W 36/0083 |
| 9,603,083 B2 | 3/2017 | Yang et al. | |
| 10,735,949 B1* | 8/2020 | Reeves | H04W 8/245 |
| 2011/0130951 A1* | 6/2011 | Lee | G01C 21/3878 |
| | | | 709/219 |
| 2011/0237250 A1* | 9/2011 | Horn | H04W 8/20 |
| | | | 455/433 |
| 2012/0142356 A1* | 6/2012 | Serravalle | H04W 36/0016 |
| | | | 455/436 |
| 2013/0208653 A1 | 8/2013 | Morioka et al. | |
| 2013/0215820 A1 | 8/2013 | Redana et al. | |
| 2014/0301371 A1* | 10/2014 | Maeda | H04W 84/005 |
| | | | 370/331 |
| 2015/0256993 A1* | 9/2015 | Bellamkonda | H04W 8/12 |
| | | | 455/433 |
| 2016/0073371 A1* | 3/2016 | Kosseifi | H04M 15/43 |
| | | | 455/406 |
| 2017/0048761 A9* | 2/2017 | Radulescu | H04W 36/0061 |
| 2017/0339722 A1* | 11/2017 | Jiao | H04W 68/02 |
| 2018/0077615 A1* | 3/2018 | El-Najjar | H04W 36/00835 |
| 2019/0306728 A1* | 10/2019 | Lei | H04W 36/0069 |
| 2020/0221521 A1* | 7/2020 | Cui | H04W 76/15 |
| 2021/0045007 A1* | 2/2021 | Stawiarski | H04W 36/00837 |
| 2021/0211899 A1* | 7/2021 | Koziol | H04W 24/10 |
| 2022/0167229 A1* | 5/2022 | Chou | H04W 24/02 |

\* cited by examiner

SYSTEMS AND METHODS FOR UPDATING PREFERRED NODES LISTS FOR WIRELESS DEVICES IN A WIRELESS NETWORK

TECHNICAL BACKGROUND

A wireless network, such as a cellular network, can include one or more access nodes each serving a number of end-user wireless devices or user equipment (UE) in a geographical area covered by the radio frequency transmissions of the access nodes. In some implementations, a wireless network may also include one or more relay nodes connected to an access node and configured to provide relay services to one or more end-user wireless devices that are indirectly connected to the access node through the relay nodes. Each of the relay nodes and end-user wireless devices may be associated with a preferred nodes list (e.g., a preferred donor cell list (or PDCL)), such that each of the relay nodes and end-user wireless devices may only connect to one of the nodes included in the preferred nodes list. In a conventional wireless network, the preferred nodes list is manually created and/or updated by an operator or user of a control server, such as a Universal Seamless Handoff Architecture (USHA) server. Manual updating is time consuming and inefficient, especially when there are a large number of relay nodes in the wireless network. Therefore, there is a need for systems and methods that are capable of automatically updating preferred nodes lists for wireless devices in a wireless network.

OVERVIEW

Exemplary embodiments described herein include systems, methods, and processing nodes for updating a preferred nodes list for a wireless device in a wireless network. An exemplary system described herein for updating a preferred nodes list for a wireless device in a wireless network includes a server in communication with a plurality of nodes each configured to deploy a radio air interface to provide wireless services to a plurality of wireless devices, the server including a processor configured to: monitor a neighbor relations table of the plurality of nodes. The processor is further configured to instruct, in response to a change in the neighbor relations table, a wireless device connected to a first node of the plurality of nodes to request an updated preferred nodes list from the server, and receive the request for the updated preferred nodes list from the wireless device. The processor is further configured to provide the updated preferred nodes list to the wireless device, the updated preferred nodes list enabling the wireless device to change from connecting to the first node included in the preferred nodes list to connecting to a second node included in the updated preferred nodes list.

An exemplary method described herein for updating a preferred nodes list for a wireless device in a wireless network includes detecting, by a server, changes in nodes of the wireless network. The method also includes in response to the detection of the changes in the nodes, instructing, by the server, a wireless device connected to a first node of the nodes to contact the server for an updated preferred nodes list. The method also includes receiving, by the server, a request for the updated preferred nodes list from the wireless device. The method also includes providing, by the server, the updated preferred nodes list to the wireless device, the updated preferred nodes list enabling the wireless device to change from connecting to the first node included in the preferred nodes list to connecting to a second node included in the updated preferred nodes list.

An exemplary method described herein for updating a preferred nodes list for a wireless device in a wireless network includes receiving, at a wireless device, instructions to request an updated preferred nodes list, the instructions being received from an access node communicating with the wireless device; transmitting a request for the updated preferred nodes list; receiving the updated preferred node list; detecting nodes listed in the updated preferred nodes list; and connecting to a detected node in response to meeting a criteria.

DETAILED DESCRIPTION

Figure 1:
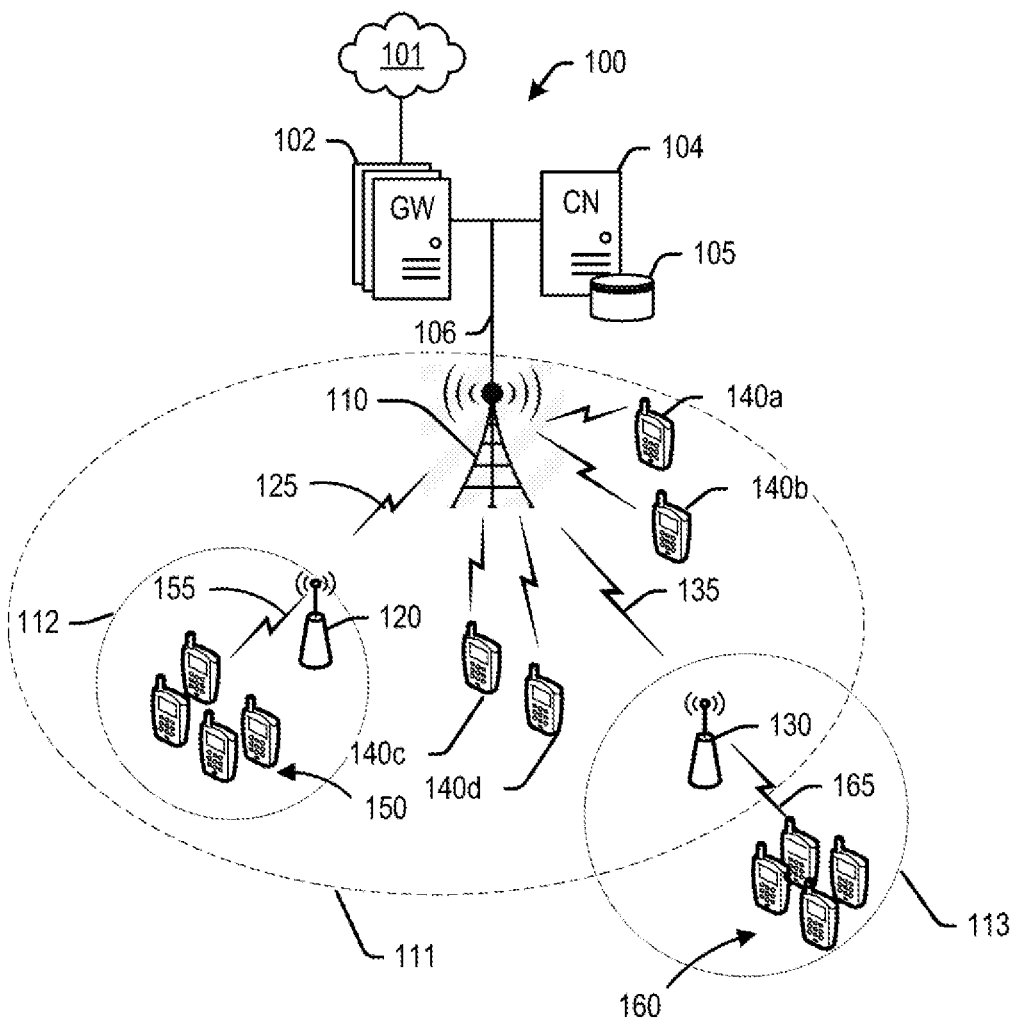
FIG. 1 depicts an exemplary system for wireless communication, in accordance with the disclosed embodiments.

Exemplary embodiments described herein include systems, methods, and processing nodes for automatically updating a preferred nodes list (e.g., a preferred donor cell list or PDCL) for a wireless device in a wireless network. In a wireless network, a plurality of wireless devices (such as end-user wireless devices and relay nodes) may be wirelessly connected to one or more access node, such as an eNodeB, a base station, etc. Under certain conditions, it may be desirable to re-allocate communication resources or re-configure the network connections, such that a wireless device (e.g., an end-user wireless device or a relay node) may switch from being connected to (and serviced by) a first node (e.g., a first access node or a first relay node), to being connected to (and serviced by) a second node (e.g., a second access node or a second relay node). The conditions for triggering the re-configuration of connections may include, for example, when a new base station or access node has been established near the wireless device, or when a base station or access node has been changed, e.g., a legacy access node being changed from a legacy Radio Access Technology (RAT) or communication protocol to a new RAT or a new communication protocol.

Each wireless device may store a preferred nodes list (e.g., list of access nodes, relay nodes), and the wireless device may connect to only the nodes included in the preferred nodes list. When the second base station or access node is not included in the preferred nodes list, the wireless device needs to obtain an updated preferred nodes list before the wireless device can connect to the second base station or access node. The preferred nodes list may be stored in the wireless device and a server in the wireless network, such as a Universal Seamless Handoff Architecture (USHA) server. In conventional wireless networks and systems, when there is a need to update the preferred nodes list, an operator or user of the server manually updates the preferred nodes list. The operator then manually sends the updated preferred nodes list to the wireless device. When the wireless network includes a large number of wireless devices, the operator manually processes a large number of updated preferred nodes list for the wireless devices. Manually updating and sending the preferred nodes lists is time consuming and inefficient.

The present disclosure provides methods and systems that enable a wireless network to automatically update the preferred nodes lists for wireless devices. The automatic update may be achieved by detecting or receiving, by a server, a trigger indicating the need to update the preferred nodes list for a wireless device. In response to the trigger, the server may update the preferred nodes list for the wireless device and store the updated preferred nodes list at the server. The server may also instruct (e.g., by sending a message to) a first node, to which the wireless device is currently connected, to send a message to the wireless device to instruct the wireless device to contact the server for the updated preferred nodes list. When the wireless device contacts the server, e.g., by sending a request or message to the server, for the updated preferred nodes list, the server may provide the updated preferred nodes list to the wireless device.

The disclosed systems and methods may be implemented at different levels. For example, the disclosed systems and methods may be implemented for automatically updating preferred nodes list for end-user wireless devices that are directly connected to an access node without being relayed by a relay node. The preferred nodes in the preferred nodes list for the end-user wireless devices may include access nodes. As another example, the disclosed systems and methods may be implemented for automatically updating preferred nodes list for relay nodes that are connected to an access node. The preferred nodes in the preferred nodes list for the relay nodes may include access nodes. As a further example, the disclosed systems and methods may be implemented for automatically updating preferred nodes list for end-user wireless devices that are connected to the access node through relay nodes. The preferred nodes in the preferred nodes list for the end-user wireless devices may include relay nodes. In some embodiments, the preferred nodes list for an end-user wireless device may include both preferred relay nodes and preferred access nodes.

Various components in the wireless network may initiate a process for updating the preferred nodes list for the wireless device. For example, the server may initiate a process for updating the preferred nodes list. When the server detects a change in the configurations, settings, capabilities, or distribution of the access nodes, the server may determine to update the preferred node list. The server may also determine that the connections between the wireless devices and the access nodes need to be re-configured. The server may instruct an access node to send a message to the wireless devices currently connected to the access node. The messages may instruct the wireless devices to contact the server to obtain an updated preferred nodes list for each wireless device.

In some embodiments, an access node may initiate a process for updating the preferred nodes list for a wireless device. For example, in one embodiment, an access node may be a newly deployed access node or may be an existing access node that has been recently changed. The change may include changing, or re-configuring, the existing access node from a first radio access technology (RAT) to a second RAT. The change may include re-configuring the existing access node protocols from a first protocol to a second protocol. The protocols may be wireless technology communication protocols. The second RAT or second protocol may be a new RAT or new protocol.

In some embodiments, during deployment of the new access node, an X2 interface may be established by the new access node with nearby access nodes or neighboring access nodes. The new access node may send an X2 setup request message to the neighboring access nodes through the X2 interface. Information about the new access node may be shared with neighboring access nodes in the X2 setup request message. The neighboring access nodes may add the new access node in their respective neighbor relations table, based on the received information in the X2 setup request message. When adding the new access nodes to their neighbor relations table, each neighboring access node may also note in the neighbor relations table the type of RAT or protocol of the new access node.

In some embodiments, during a change of an existing access node, an X2 interface with nearby access nodes or neighboring access nodes may already be established by the existing access node. After the change, the updated existing access node may send an eNodeB configuration update message to the neighboring access nodes through the X2 interface. Information about the updated access node may be shared with neighboring access nodes in the eNodeB configuration update message. The neighboring access nodes may note in their respective neighbor relations table the change to the updated access node based on the received information in the eNodeB configuration update message. When updating information about the updated access nodes to their neighbor relations table, each neighboring cell may also note in its neighbor relations table the type of RAT or protocol of the updated access node.

In some embodiments, the server may monitor the neighbor relations table of the neighboring access nodes for new access nodes or existing access nodes with changes in RAT or protocols. If an access node with a new or changed RAT or protocol is detected during a neighbor relations event, the server will update a preferred node list noting the new or changed RAT/protocol of the access node, and instruct wireless device to perform a re-scan for access nodes.

In a further embodiment, the server may instruct the wireless device to request an updated preferred node list in response to detecting a new access node having a new RAT or protocol. Alternatively, or in addition to, the server may instruct the wireless device to request an updated preferred node list in response to detecting an updated access node having a changed RAT or protocol.

In a further embodiment, the wireless device performs a re-scan of available neighboring access nodes. When the wireless device detects, via the re-scan, a new or updated access node with a new or changed RAT or protocol, and the wireless device determines a Reference Signal Receive Power (RSRP) or Signal-to-Interference-and-Noise Ratio (SINR) of the detected access node. The wireless device compares the RSRP or SINR to an RSRP or SINR of an access node that is currently serving the wireless device. When the detected access node has a better RSRP or SINR than the current access node, the wireless device changes from the current access node to the detected access node.

In a further embodiment, the wireless device may determine whether the detected access node is included in an updated preferred node list received from the server prior to changing to the detected node.

The term "wireless device" refers to any wireless user equipment included in a wireless network. The term "wireless device" may include an end-user wireless device (e.g., a mobile phone or other mobile device), or a relay device (or relay node) that provide relay services to the end-user wireless device. The term "end-user wireless device" refers to end-user communication equipment, such as a mobile phone, which may be directly connected to an access node without being relayed by a relay node.

The term "node" refers to an access node, a relay node, or any other node that may provide communication services to a wireless device. The term "preferred nodes list" refers to a list of preferred nodes that provide communication services to a wireless device, such as preferred access nodes and/or preferred relay nodes. For example, when a wireless device is an end-user wireless device directly connected to an access node without being relayed by a relay node, the nodes included in the preferred nodes list may include preferred access nodes. When a wireless device is an end-user wireless device connected to the access node through a relay node, the nodes included in the preferred nodes list may include preferred relay nodes. When the wireless device is a relay node connected to an access node, the nodes included in the preferred nodes list may include preferred access nodes. When the wireless device is an end-user wireless device connected to an access node through a relay node, the nodes included in the preferred nodes list may include both preferred relay nodes and preferred access nodes.

The term "trigger" may include any condition, data, signal, message, request, determination, or analysis result, which may cause a server to make a determination that a preferred nodes list should be updated for a wireless device. For example, a trigger may be a detection by the server that a new access node is added to the network, which may have a new RAT or communication protocol. A trigger may be a detection by a server that an existing access node has been changed. The detected change may be a change from a first RAT to second RAT. The detected change may be a change from a first protocol to a second protocol. The protocols may include a wireless communication protocol and/or licensed versus unlicensed spectrum protocol.

An exemplary system or wireless network described herein includes at least an access node, such as an eNodeB or a base station, and a plurality of end-user wireless devices wirelessly connected to the access node. The system may also include a relay node in wireless communication with the access node and configured to relay data packets between the access node and an end-user wireless device served by the relay node.

Relay nodes may improve communication service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. When relay nodes are connected to an access node, the access node may be referred to as a "donor" access node or a donor cell. Relay nodes may be configured to communicate with the "donor" access node via a wireless backhaul connection or backhaul, and to deploy a radio air interface to which end-user wireless devices can attach. Donor access nodes may include scheduling modules or schedulers for scheduling or allocating resources to wireless devices directly connected thereto, as well as to the relay nodes connected to the donor access nodes through the wireless backhaul connection.

In some embodiments, a relay node may include a first component for communicating with the donor access node via a wireless backhaul connection and a second component for deploying a wireless air interface. End-user wireless devices can attach to the wireless air interface deployed by the relay node to access network services provided by the donor access node. For example, the first component may include a wireless device for communicating with the donor access node via the backhaul (hereinafter, the first component may be referred to as "relay wireless device" or "relay user equipment" or "Relay UE"). The second component may include a small-cell access node (hereinafter the second component may be referred to as "relay access point"), which may communicate with end-user wireless devices that rely on the relay node for communicating with the donor access node. Alternatively, the first and second components may be combined into a single relay node device.

In addition to the systems and methods described herein, the operations for automatically updating the preferred nodes list for a wireless device may be implemented as computer-readable instructions or methods, and processing nodes on the network for executing the instructions or methods. A processing node may be a processor included in the access node or may be a processor included in any controller node or server in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a first radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. The end-user wireless devices and the relay nodes may be generally referred to as wireless devices. The relay nodes and the access node may be generally referred to as nodes. For example, relay node 120 is a node for end-user wireless devices 150, and access node 110 is a node for relay node 120 (which is also a wireless device).

In the exemplary embodiment shown in FIG. 1, access node 110 may be a macro-cell access node, such as a base station, and may be configured to deploy the first radio air interface over a coverage area 111. Each of relay nodes 120, 130, and each of end-user wireless devices 140a, 140b, 140c, and 140d may be attached to the first radio air interface deployed by access node 110. Relay nodes 120 and 130 may be configured to communicate with access node 110 over wireless communication links 125 and 135, respectively (hereinafter, "wireless backhaul" or "backhaul"). Relay nodes 120, 130 may be further configured to deploy additional wireless radio air interfaces (e.g., second and third radio air interfaces) over coverage areas 112 and 113, respectively. A plurality of end-user wireless devices 150 may be configured to attach to a wireless radio air interface or link 155 deployed by relay node 120, and a plurality of end-user wireless devices 160 may be configured to attach to a wireless air interface or link 165 deployed by relay node 130. All of the end-user wireless devices 150 and 160 are indirectly attached to the first radio air interface deployed by access node 110 through relay nodes 120 and 130.

In some embodiments, end-user wireless devices 150 and 160 may access network services using the combination of relay nodes 120 and 130, wireless backhaul links 125 and 135, and access node 110. In some embodiments, end-user wireless devices 140a, 140b, 140c, and 140d may access network services by directly connecting to access node 110. As shown in FIG. 1, end-user wireless devices 160 are illustrated as being located outside of coverage area 111 of access node 110. End-user wireless devices 160 may access network services provided by access node 110 through relay node 130. In this configuration, access node 110 may be referred to as a "donor" access node. In other embodiments, any other combination of donor access nodes, relay nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations such as those described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

End-user wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. End-user wireless devices 140a, 140b, 140c, and 140d may be directly communicating with access node 110 without using a relay node, whereas end-user wireless devices 150 and 160 may be indirectly communicating with access node using relay nodes 120 and 130. Each of end-user wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 150 and 160. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5GNR). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G New Radio (5G NR), and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein, including operations relating to dynamically selecting the number of transmitting ports in an antenna at access node 110. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
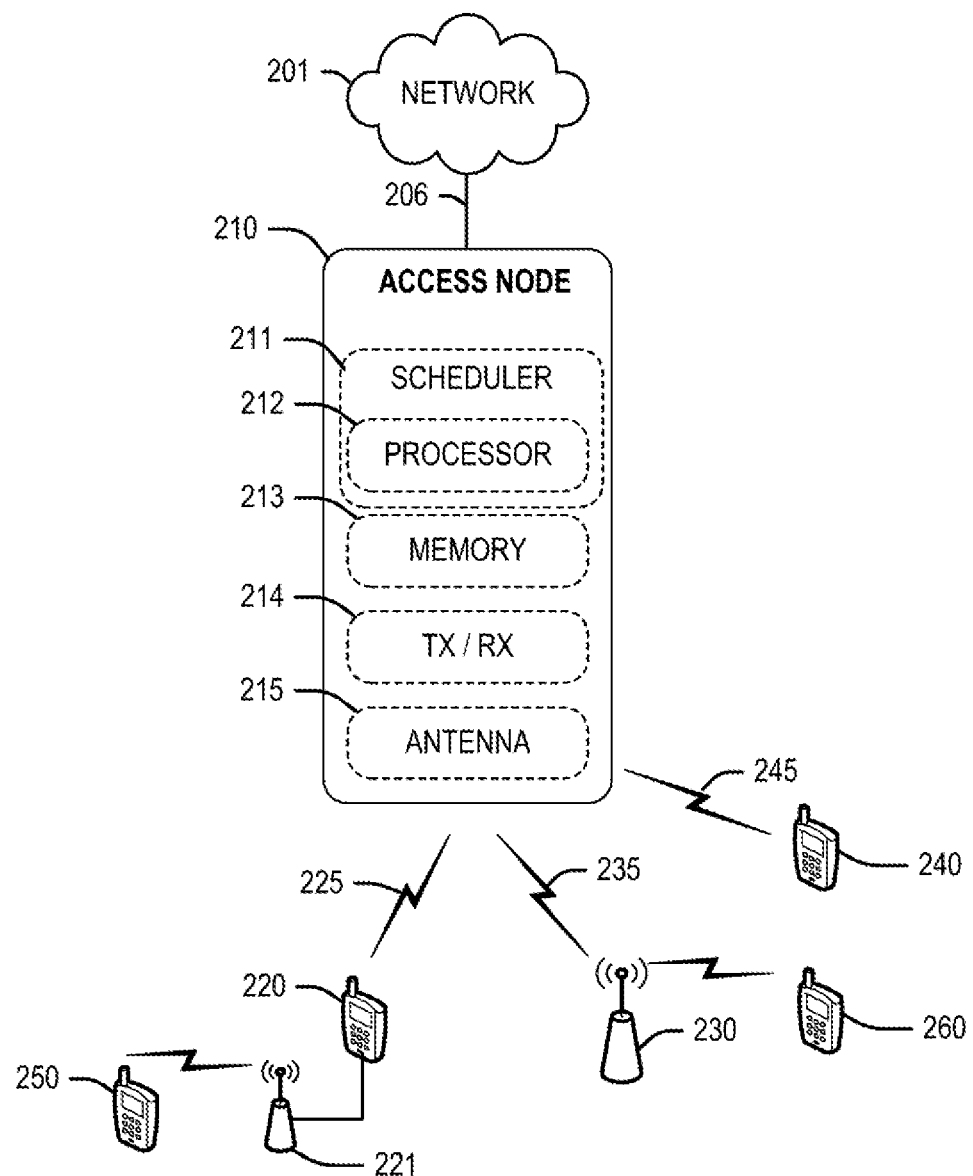
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including uplink and/or downlink resources, for relay nodes communicatively coupled to access node 210. In some embodiments, processor 212 of scheduler 211 may be configured to execute instructions stored on memory 213 for performing various methods disclosed herein. Transceiver 214 and antenna 215 may be configured to enable wireless communication with a relay wireless device 220, a relay node 230, and an end-user wireless device 240. Relay wireless device 220 may communicate with access node 210 through a wireless link 225. Relay node 230 may communicate with access node 210 through a wireless link 235. End-user wireless device 240 may communicate with access node 210 through a wireless link 245. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210. Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
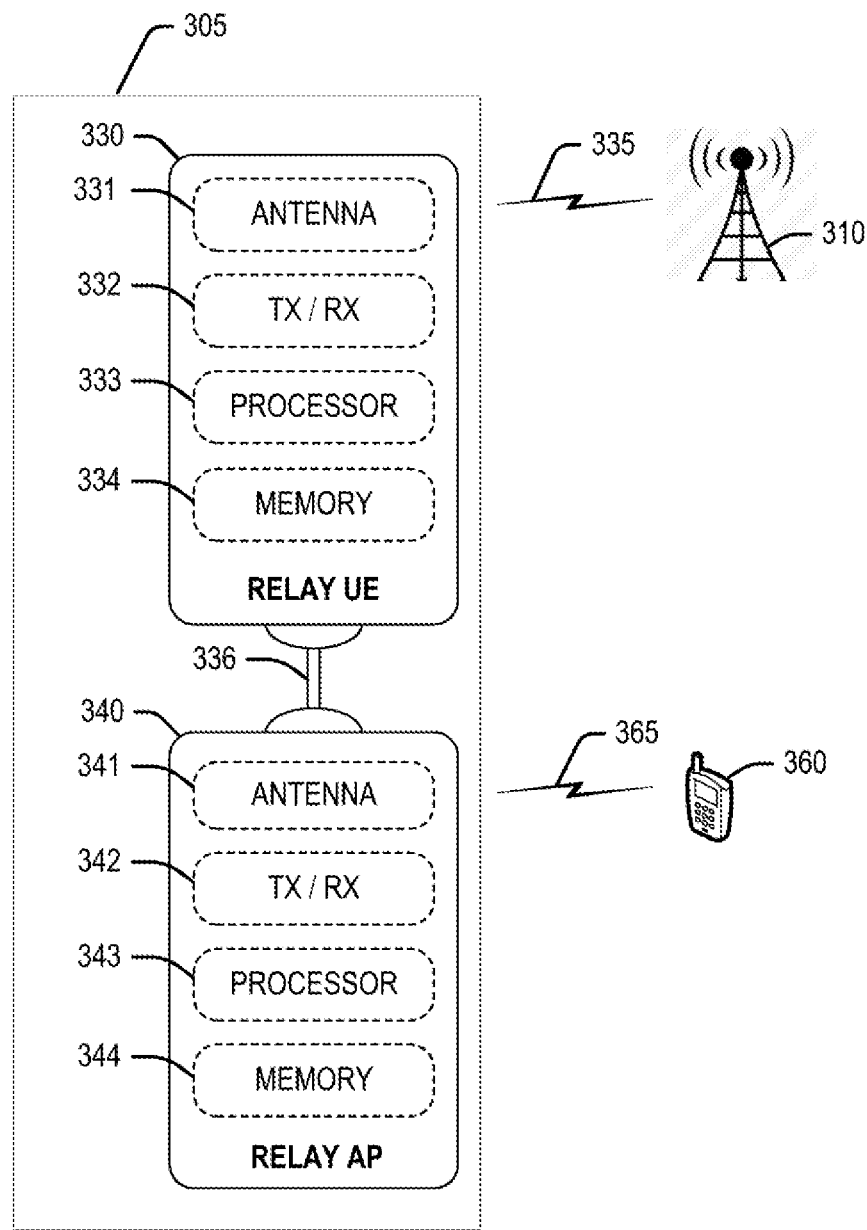
FIG. 3 depicts an exemplary relay node, in accordance with the disclosed embodiments.

FIG. 3 depicts an exemplary relay node 305 including a relay wireless device (relay user equipment or relay UE) 330 and a separate relay access point (relay AP) 340. Relay node 305 may be an embodiment of relay node 120 and/or 130. Relay wireless device 330 may include an antenna 331 for direct (i.e., unrelayed) communication with a donor access node 310 via a wireless backhaul link 335. Access node 310 may be an embodiment of access node 110 and/or access node 210. Relay wireless device 330 may also include a transceiver 332, a processor 333, and a memory 334 for storing instructions that enable relay wireless device 330 to perform operations described herein. In some embodiments, relay wireless device 330 may be referred to as a customer premise equipment (CPE), which may be a stationary LTE wireless device having a stronger computational & radio frequency capability versus standard wireless devices. Relay wireless device 330 may include a directional antenna and a dedicated power supply, enabling relay wireless device 330 to efficiently provide resources to wireless device 360 via relay access point 340 and a communication link 365. In some embodiments, relay access point 340 may be co-located with relay wireless device 330, and may be connected to relay wireless device 330 via a communication interface 336. In some embodiments, relay access point 340 and relay wireless device 330 may be included in a single device. Communication interface 336 may be a suitable interface that enables communication (e.g., direct communication) between relay wireless device 330 and relay access point 340, such as USB, FireWire, Ethernet, or any other serial, parallel, analog, or digital interface. In some embodiments, relay node 305 may be configured to perform functions similarly performed by an access node (e.g., access node 210). For example, in some embodiments, relay node 305 may include a scheduler configured to schedule resources for a plurality of wireless devices connected to relay node 305. As another example, processor 333 included in relay node 305 may perform various operations disclosed herein for automatically updating a preferred nodes list for a wireless device.

In operation, in some embodiments, relay wireless device 330 may be configured to relay network services from donor access node 310 to wireless device 360 via relay access point 340. Relay wireless device 330 may begin to function as a relay wireless device by sending a message to donor access node 310 to indicate that wireless device 330 is functioning as a relay wireless device. Once the status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In some embodiments, a specific class indicator may be assigned to wireless backhaul link 335 between relay wireless device 330 and donor access node 310. The class indicator may be a QoS Class Identifier (QCI) that is different from other QCIs assigned to wireless devices that are directly connected to donor access node 310. In other embodiments, upon determining that a resource requirement or traffic type of wireless device 360 meets a threshold or other criteria, the class indicator of wireless backhaul link 335 may be adjusted to meet the resource requirement or provide an appropriate QoS for the traffic type.

Referring to FIG. 3, relay access point 340 is illustrated as having an antenna 341 and a transceiver 342 for enabling communication with wireless device 360, a processor 343, and a memory 344 for storing instructions that are executable by processor 343. In some embodiments, relay access point 340 may be a home eNodeB. Moreover, although only one transceiver is depicted in each of relay wireless device 330 and relay access point 340, additional transceivers may be incorporated in order to facilitate communication across communication interface 336 and other network elements. In operation, relay access point 340 may be configured to deploy a carrier by the combination of antenna 341 and transceiver 342, and enable end-user wireless device 360 to attach thereto.

Figure 4:
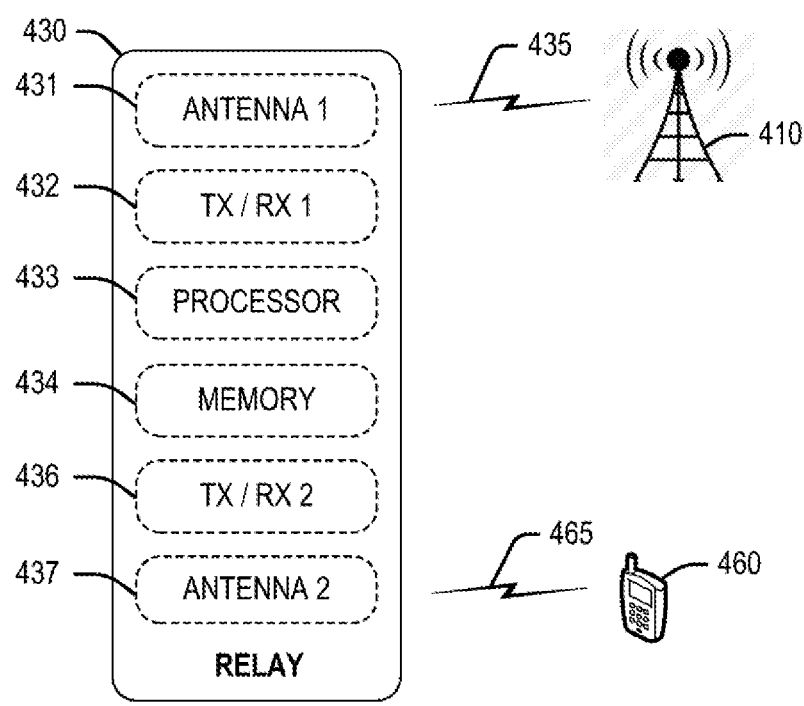
FIG. 4 depicts another exemplary relay node, in accordance with the disclosed embodiments.

In some embodiments, a relay node may integrate components of both a relay wireless device and a relay access point into a single unit. FIG. 4 depicts an exemplary relay node 430 according to this configuration. Relay node 430 may be an embodiment of relay node 120 and/or 130. Relay node 430 is illustrated as having a first antenna 431 for direct (i.e., unrelayed) communication with a donor access node 410 via a wireless backhaul link 435. Access node 410 may be an embodiment of access node 110, access node 210, and/or access node 310. Relay node 430 may include a first transceiver 432, a processor 433, and a memory 434 for storing instructions that are executable by processor 433 as described herein. Relay node 430 may further include a second transceiver 436 and a second antenna 437 for enabling communication with wireless device 460 via a wireless link 465. Relay node 430 may perform operations disclosed herein, including those described above with respect to FIG. 3. In some embodiments, relay node 430 may be configured to perform functions similarly performed by an access node. For example, relay node 430 may include a scheduler configured to schedule resources for a plurality of wireless devices connected to the relay node. As another example, processor 433 of relay node 430 may perform various operations disclosed herein for automatically updating a preferred nodes list for a wireless device.

In some embodiments, the relay nodes may be configured to function as one or more of a layer 1 (L1), layer 2 (L2), or layer 3 (L3) relay node. An L1 relay node functions as a booster or repeater. In other words, an L1 relay node performs an amplify and forward (AF) function. RF signals received from a donor access node are amplified and transmitted to end-user wireless devices by an L1 relay node. Likewise, RF signals received from end-user wireless devices are amplified and transmitted to donor access nodes by an L1 relay node. An L2 relay node performs a decode and forward (DF) function. RF signals received from a donor access node are demodulated and decoded, then encoded, modulated, and transmitted to a wireless device by an L2 relay node. Likewise, RF signals received from a wireless device are demodulated and decoded, then encoded, modulated, and transmitted to a donor access node by an L2 relay node. An L3 relay node performs a decode and forward function. An L3 relay node also performs additional processing, such as data ciphering, data concatenation, data segmentation, and/or data reassembly. In other words, a relay node depicted herein performs demodulation and decoding of the received RF signals (either uplink or downlink), processes received data, then encodes, modulates, and transmits the data between two communication devices. In some embodiments, a relay node may include functions that are similarly performed by an access node. For example, a relay node may include a scheduler that performs resource scheduling. The scheduler may include a processor (such as processor 333, 343, or 433) configured to perform the resource scheduling functions or operations disclosed herein.

Figure 5:
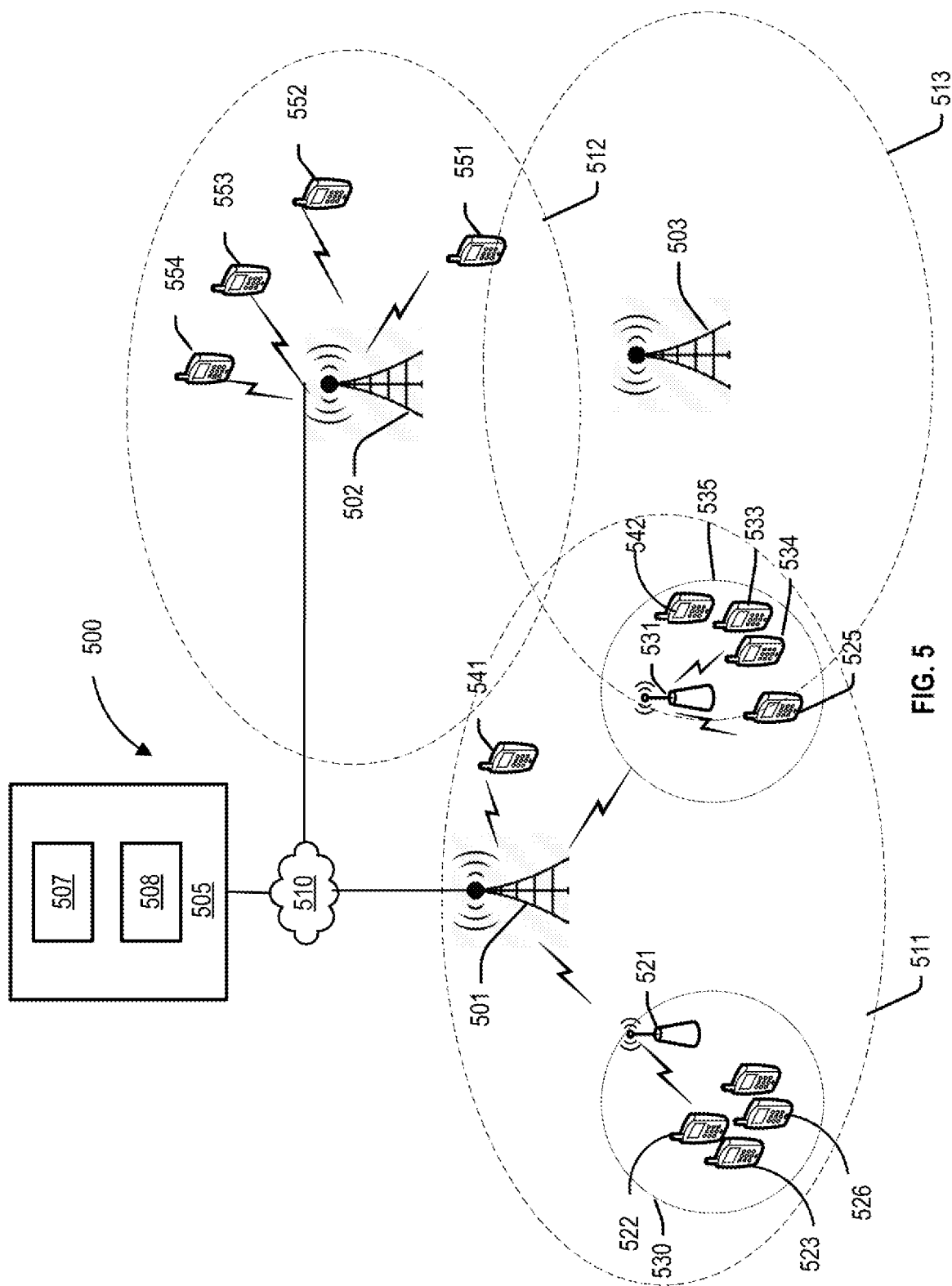
FIG. 5 depicts an exemplary system for wireless communication, in accordance with the disclosed embodiments.

FIG. 5 depicts an exemplary system 500 in which the disclosed systems and methods for updating preferred nodes lists for wireless devices may be implemented. System 500 may be a wireless network, such as a cellular network disclosed herein. System 500 may include a server 505 in communication with a plurality of access nodes 501, 502 via a communication network 510. In some embodiments, server 505 may be a Universal Seamless Handoff Architecture (USHA) server. Server 505 may be included in any device or entity that may be in communication with the access nodes 501, 502, such as, for example, controller node 104 shown in FIG. 1, or a Mobility Management Entity. In some embodiments, server 505 may be a standalone server in communication with access nodes 501, 502. Server 505 may include hardware and software components. For example, server 505 may include a processor 507 specially programmed to execute computer-executable codes or instructions stored in a memory 508 to perform various methods disclosed herein. Server 505 may also include other storage devices, displays, input/output devices, and/or communication interfaces configured to communicate with access nodes 501, 502 through network 510. Network 510 may be any of the wireless or wired networks disclosed herein. Access nodes 501, 502 may be embodiments of access nodes 110, 210, 310, and 410.

Server 505 may be configured to communicate with access nodes 501, 502, and may receive messages and/or requests from access nodes 501, 502. Server 505 may process the messages received from access nodes 501, 502 to obtain information regarding the operational status, such as traffic conditions, capability, signal strength, quality of service, etc., relating to access nodes 501, 502. Server 505 may be configured to send instructions (e.g., via messages of suitable format) to access nodes 501, 502. For example, server 505 may instruct one or more of access nodes 501, 502 to send a modified Radio Resource Control (RRC) Connection Reconfiguration message to one or more wireless devices within their respective coverage area, to instruct the one or more wireless devices to contact server 505 for an updated preferred nodes list. The modified RRC Connection Reconfiguration message may be configured to include an indicator (e.g., a data bit, a data field, a flag, etc.) to indicate to the one or more wireless devices that an updated preferred nodes list is available at server 505, and that the one or more wireless devices can contact server 505 to obtain a copy of the updated preferred nodes list.

Each of access nodes 501 and 502 may serve one or more end-user wireless devices, directly, or indirectly through a relay node. In the embodiment shown in FIG. 5, access node 501 is configured to deploy a radio air interface over a coverage area 511. Access node 501 may be configured to serve (e.g., provide wireless services to) a plurality of directly connected end-user wireless devices 541, 542, as well as a plurality of indirectly connected end-user wireless devices 522, 523, 525, 526, 533, and 534 through relay nodes 521 and 531. Relay nodes 521 and 531 may each be an embodiment of relay nodes 120, 130, 221, 230, 305, and/or 430. Relay node 521 may deploy a wireless radio air interface over a coverage area 530, and relay node 531 may deploy a wireless radio air interface over a coverage area 535.

Access node 502 may be configured to deploy a radio air interface over a coverage area 512. Access node 502 may serve a plurality of directly connected end-user wireless devices 551, 552, 553, and 554. Although not shown in FIG. 5, it is understood that access node 502 may also serve a plurality of end-user wireless devices through one or more relay nodes. Both of access nodes 501 and 502 may be connected to server 505 through network 510.

In some embodiments, a new access node 503 may be newly established or added to the wireless network or system 500, and it may have a new RAT or use a new wireless communications protocol. Access nodes 501, 502 may detect the new access node 503 and update their neighbor relations table. For example, the new access node 503 may send a X2 setup request message to neighboring access nodes 501, 502. In the setup request message, the type of RAT or wireless communications protocol of the new access node 503 may be indicated. Based the received X2 setup request, neighboring access nodes 501, 502 may detect the new access node 503 and note the type of RAT and/or wireless communications protocol of the new access node 503. The RAT and/or wireless communication protocol of the new access node 503 may be a different RAT or wireless communication protocol of neighboring access nodes 501, 502. For example, access nodes 501, 502 may use a first RAT and/or first wireless communication protocol and the new access node 503 may use a second RAT and/or a second wireless communication protocol.

In some embodiments, access node 503 may be an existing access node that has been changed or updated. The change may include changing from a first RAT to a second RAT and/or changing from a first wireless protocol to a second protocol. Access For example, the updated access node 503 may send a eNodeB configuration update message to neighboring access nodes 501, 502 through an X2 interface. In the configuration update message, the type of RAT or wireless communications protocol of the updated access node 503 may be indicated. Based the received configuration update message, neighboring access nodes 501, 502 may detect the updated access node 503 and note the type of RAT and/or wireless communications protocol of the new access node 503. The RAT and/or wireless communication protocol of the updated access node 503 may be a different RAT or wireless communication protocol of neighboring access nodes 501, 502. For example, access nodes 501, 502 may use a first RAT and/or first wireless communication protocol and the updated access nod 503 may use a second RAT and/or a second wireless communication protocol.

Server 505 may detect the establishment of the new or updated access node 503, and may initiate the process for updating the preferred nodes list for some of the wireless devices connected to access nodes 501, 502, such that these wireless devices may be connected to the new access node. The detection of the establishment of the new access node may constitute a trigger for initiate the process for updating the preferred nodes list for some of the wireless devices connected to access nodes 501, 502. In some embodiments, access nodes 501, 502 may detect the establishment of the new or updated access node 503, for example, from an interference signal received from the new or updated access node 503. The server 505 may monitor the access nodes' 501, 502 neighbor relations tables for changes. For example, the server may periodically check the access nodes' 501, 502 neighbor relations tables for changes. When the access nodes' 501, 502 neighbor relations tables are updated with a new access node, or show an access node's RAT and/or communications protocol is changed, the server 505 will detect the update through the monitoring.

In some embodiments, when the server 505 detects a new or updated access node 503 with an RAT and/or communication protocol that is different from the access nodes' 501, 502 RAT and/or communication protocol, the server 505 may instruct a wireless device to initiate a re-scan. For example, the server 505 may determine access nodes' 501, 502 have a first RAT and/or first communication protocol, and a new or updated access node 503 has a second RAT and/or second communication protocol. Based on the determination, the server 505 instructs the wireless device to initiate a re-scan. The wireless device will scan neighboring access nodes. When the wireless device detects, via the re-scan, the new or updated access node 503, and the wireless device determines a Reference Signal Receive Power (RSRP) or Signal-to-Interference-and-Noise Ratio (SINR) of the new or updated access node 503. The wireless device compares the RSRP or SINR to an RSRP or SINR of the serving access node 501 and/or 502 that is currently serving the wireless device. When the new or updated access node 503 has a better RSRP or SINR than the serving access node 501 and/or 502, the wireless device changes from the serving access node 501 and/or 502 to the new or updated access node 503. For example, the serving access node 501 and/or 502 performs a handover of the wireless device to the new or updated access node 503.

Wireless devices, including end-user wireless devices and relay nodes, may each store a preferred nodes list locally. The preferred nodes list may also be stored at server 505. Any update to the preferred nodes list may be performed at server 505, and copies of the updated preferred nodes list may be obtained by the wireless devices from server 505. In some embodiments, a wireless device may connect to a node when the node is included in the preferred nodes list. Before the wireless device can connect to a new or updated access node 503 that is not included in the preferred nodes list, the preferred nodes list may be updated to include the other node. Server 505 may update the preferred nodes list in response to the detecting the establishment of a new or updated access node 503 discussed herein.

For example, server 505 may collect information from relay nodes and/or access nodes that may provide services to the end-user wireless device and determine which relay nodes and/or access nodes can be included in an updated preferred nodes list. The information collected from relay nodes and/or access nodes may indicate the RAT type and/or communication protocol associated with the relay nodes and/or access nodes.

After determining which relay nodes and/or access nodes can be included in the updated preferred nodes list, server 505 may update the preferred nodes list stored at server 505 for a wireless device. Server 505 may instruct an access node and/or a relay node (e.g., access node 501 and/or relay node 521) to send a message to the end-user wireless device (e.g., end-user wireless device 541 and/or 522). The message sent by the access node and/or the relay node to an end-user wireless device may be any suitable message for instructing the end-user wireless device to contact server 505 for the updated preferred nodes list. In some embodiments, the message may be a modified Radio Resource Control (RRC) Connection Reconfiguration message that contains an indicator instructing the wireless devices to contact the server for an updated preferred nodes list. For example, the modified RRC Connection Reconfiguration message may include a data bit, a data field, or a flag to indicate to the end-user wireless device that an updated preferred nodes list is available at server 505. In some embodiments, the data bit, data field, or flag may instruct the end-user wireless device to contact server 505 for an updated preferred nodes list. In some embodiments, the modified RRC Connection Reconfiguration message may also notify the end-user wireless device which new access node and/or relay node it can connect to. In some embodiments, the message may force or cause the end-user wireless device to contact server 505 to update its preferred nodes list. In some embodiments, the message may force or cause the end-user wireless device to immediately contact server 505 to update its preferred nodes list. In some embodiments, the message may force or cause the end-user wireless device to contact server 505 to update its preferred nodes list based on a criterion, such as within a predetermined time period (e.g., within 10 minutes, 30 minutes, 1 hour, 1 day, etc.), or after termination of a current communication session. In some embodiments, when the end-user wireless device does not contact server 505 within the predetermined time period, server 505 may repeat the operations, including instructing access node and/or relay node to which the end-user wireless device is connected to send a message to the end-user wireless device, thereby instructing, forcing, or causing the end-user wireless device to contact server 505 to obtain the updated preferred nodes list.

The end-user wireless device may contact server 505 and update its preferred nodes list, e.g., by obtaining the updated preferred nodes list from server 505 and storing it at the end-user wireless device. The end-user wireless device may then initiate a handover to change the access node and/or the relay node to which the end-user wireless device is connected. The end-user wireless device may select a new preferred node (access node and/or relay node) from the updated preferred nodes list and switch its connection from connecting to the current access node and/or relay node to connecting to the selected new preferred access node and/or relay node.

In some embodiments, server 505 may instruct access node 501 to send a message to relay node 521. The message may be any suitable message that may instruct relay node 521 to contact server 505 for the updated preferred nodes list. In some embodiments, the message may be a modified Radio Resource Control (RRC) Connection Reconfiguration message that contains an indicator instructing relay node 521 to contact the server for an updated preferred nodes list. For example, the modified RRC Connection Reconfiguration message may include a data bit, a data field, or a flag to indicate to relay node 521 that an updated preferred nodes list is available at server 505. In some embodiments, the data bit, data field, or flag may instruct relay node 521 to contact server 505 for an updated preferred nodes list. In some embodiments, the modified RRC Connection Reconfiguration message may also notify relay node 521 which new access node it can connect to. In some embodiments, the data bit, data field, or flag included in the message may force or cause relay node 521 to contact server 505 to update its preferred nodes list. In some embodiments, the message may force or cause relay node 521 to immediately contact server 505 to update its preferred nodes list. In some embodiments, the message may force or cause relay node 521 to contact server 505 to update its preferred nodes list based on a criterion, such as within a predetermined time period (e.g., within 10 minutes, 30 minutes, 1 hour, 1 day, etc.), or after termination of a current communication session. In some embodiments, when relay node 521 does not contact server 505 within the predetermined time period, server 505 may repeat the operations, including instructing access node 501 to which relay node 521 is connected to send a message to relay node 521, where the message forces or causes relay node 521 to contact server 505 to obtain the updated preferred nodes list.

In some embodiments, server 505 may periodically analyze information collected from access nodes, relay nodes, end-user wireless devices, and/or other network entities (e.g., Mobility Management Entity) to perform an optimization of the network configuration. For example, server 505 may monitor information of the network, such as the distribution of access nodes, relay nodes, end-user wireless devices, the capacities of access nodes and relay nodes, the current traffic conditions handled by each access node and/or relay node, etc. The monitoring of the network information may be performed continuously in real time, or may be performed periodically at a predetermined time interval (e.g., every 30 minutes, 1 hour, 2 hours, 1 day, etc.). In some embodiments, the monitoring of the network information may be performed in response to a trigger, such as a message or a request received from another network entity, such as an end-user wireless device, a relay node, an access node, etc. Server 505 may analyze data or information collected during the monitoring, and may perform an optimization of the network configuration. Optimization may be performed using any suitable algorithm, such as a neuro-network based optimization algorithm. When server 505 determines that the network connections need to be re-configured based on a result of the optimization, server 505 may adjust the network configuration by re-configuring the connections between the access nodes, the relay nodes, and the end-user wireless devices. To re-configure the connections, server 505 may update preferred nodes list for the relay nodes and/or end-user wireless devices. Server 505 may instruct the access nodes to send messages to one or more wireless devices connected to the access nodes, such as one or more relay nodes and/or end-user wireless devices. The messages may instruct the relay nodes and/or end-user wireless devices to contact server 505 for the updated preferred nodes list. The messages may be modified RRC Connection Reconfiguration messages disclosed herein. After contacting server 505 and obtaining their respective updated preferred nodes list, the end-user wireless devices and/or relay nodes may change their connections to the access nodes by connecting to new access nodes included in the updated preferred nodes list. In some embodiments, the end-user wireless devices may change their connections to the relay nodes by connecting to new relay nodes included in the updated preferred nodes list. The process of monitoring the network, optimizing the network configuration, updating preferred nodes lists, and re-connecting to nodes included in the updated preferred nodes lists may be repeatedly performed via various network components at a predetermined time interval.

Figure 6:
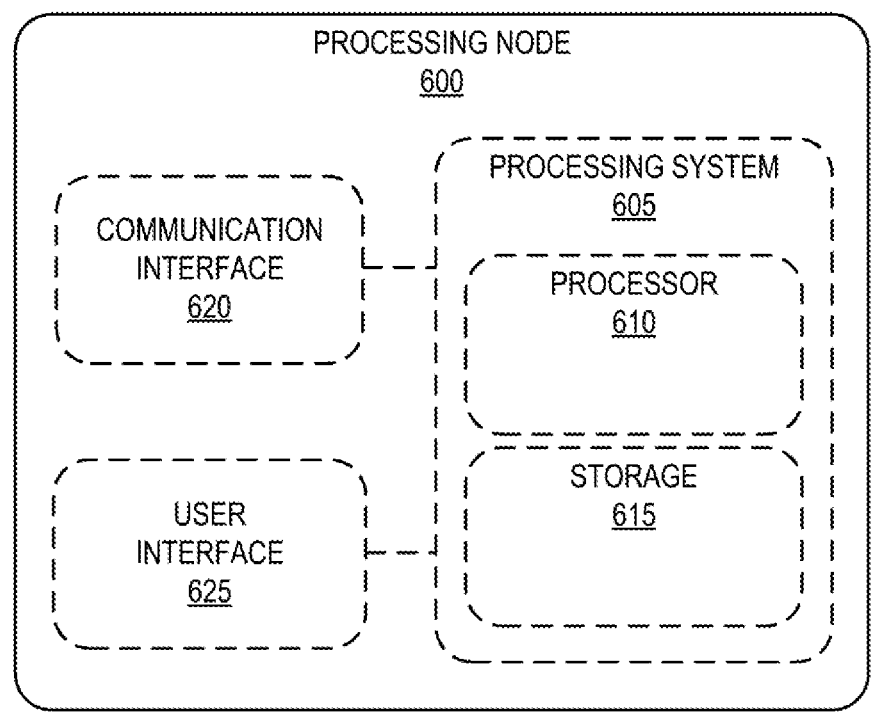
FIG. 6 depicts an exemplary processing node, in accordance with the disclosed embodiments.

FIG. 6 depicts an exemplary processing node 600, which may be configured to perform the methods and operations disclosed herein for automatically updating a preferred nodes list for a wireless device. In some embodiments, processing node 600 may be included in an access node, such as access node 110, 210, 310, 410, 501, 502, and 503. In some embodiments, processing node 600 may be included in controller node 104. In some embodiments, processing node 600 may be included in server 505. For example, processing node 600 may include processor 507 and memory 508 depicted in FIG. 5.

Processing node 600 may be configured to determine, in response to a trigger discussed herein, that connections between access nodes and relay nodes, connections between relay nodes and end-user wireless devices, and/or connections between access nodes and end-user wireless devices need to be adjusted or re-configured. Processing node 600 may instruct an access node to send a message to one or more relay nodes and/or end-user wireless devices. The message may instruct the relay nodes and/or end-user wireless devices to contact server 505 for their respective updated preferred nodes list. The relay nodes and/or end-user wireless devices may contact server 505 and obtain a copy of the updated preferred nodes list, respectively.

Processing node 600 may include a processing system 605. Processing system 605 may include a processor 610 and a storage device 615. Storage device 615 may include a disk drive, a flash drive, a memory, or other storage device configured to store data and/or computer readable instructions or codes (e.g., software). The computer executable instructions or codes maybe accessed and executed by processor 610 to perform various methods disclosed herein. Software stored in storage device 615 may include computer programs, firmware, or other form of machine-readable instructions, including an operating system, utilities, drivers, network interfaces, applications, or other type of software. For example, software stored in storage device 615 may include a module for performing various operations described herein. Processor 610 may be a microprocessor and may include hardware circuitry and/or embedded codes configured to retrieve and execute software stored in storage device 615.

Processing node 600 may include a communication interface 620 and a user interface 625. Communication interface 620 may be configured to enable the processing system 605 to communicate with other components, nodes, or devices in the wireless network. Communication interface 620 may include hardware components, such as network communication ports, devices, routers, wires, antenna, transceivers, etc. User interface 625 may be configured to allow a user to provide input to processing node 600 and receive data or information from processing node 600. User interface 625 may include hardware components, such as touch screens, buttons, displays, speakers, etc. Processing node 600 may further include other components such as a power management unit, a control interface unit, etc.

Figure 7:
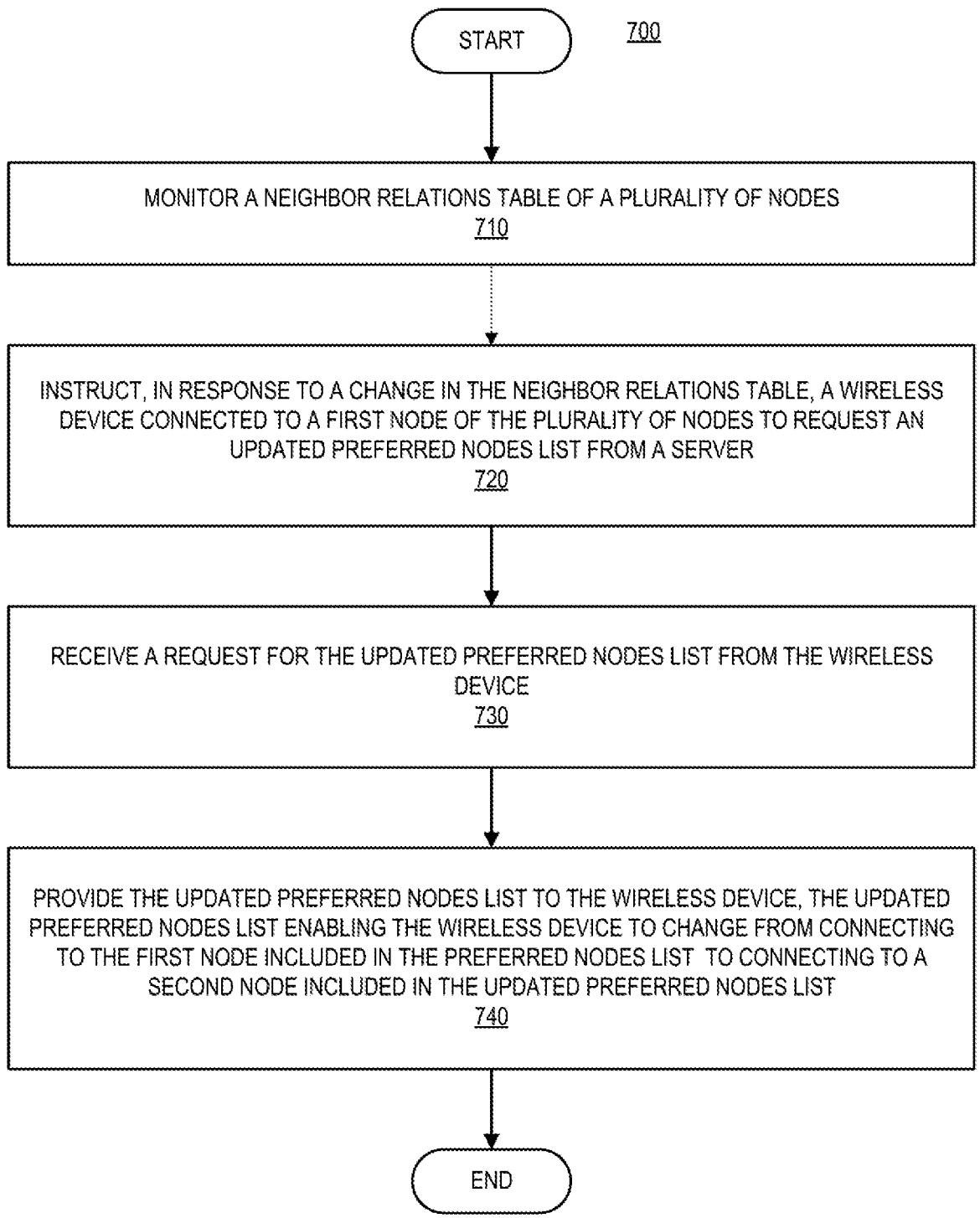
FIG. 7 depicts a flowchart illustrating an exemplary method for updating a preferred nodes list for a wireless device, in accordance with the disclosed embodiments.

FIG. 7 is a flowchart illustrating an exemplary method for automatically updating a preferred nodes list for a wireless device in a wireless network. Method 700 may be performed by any suitable processor discussed herein, for example, a processor included in an access node (e.g., access nodes 110, 210, 310, 410, 501, 502, 503), a processor included in a relay node (e.g., relay nodes 120, 130, 221, 230, 305, 430, 521, 531), processor 610 included in processing node 600, processor 507 included in server 505, or a processor included in controller node 104. For discussion purposes, as an example, method 700 is described as being performed by processor 507 included in server 505.

Method 700 may include monitoring nodes of a wireless network (operation 710). For example, server 505 may monitor neighbor relations tables of nodes 501, 503. instructing, in response to a change in the neighbor relations tables, a first node to send a message to a wireless device connected to the first node, the message instructing the wireless device to contact the server for an updated preferred nodes list (step 720). For example, processor 507 of server 505 may detect a trigger for initiating a process to update one or more preferred nodes lists for one or more wireless devices. The trigger may be changes in the conditions of the access nodes included in the wireless network. For example, the conditions changed may include a new access node having been added to the wireless network, or settings and/or configurations of an existing access node having been changed such that a first RAT and/or first communication protocol of the existing access node has been changed to a second RAT and/or second communication protocol.

In some embodiments, processor 507 of server 505 may determine a trigger based on an update in neighbor relations tables of access nodes 501, 502. For example, access node 503 may be a new access node added to the network or may be an existing access node that has been updated or changed. The new access node 503 may have an RAT and/or communication protocol that is different from the RAT and/or communication protocol of access nodes 501 and 502. Alternatively, access node 503 may be an updated access node, where the update includes changing the RAT and/or communication protocol from a first RAT and/or first communication protocol to a second RAT and/or second communication protocol. The new or updated access node 503 may send a message to neighboring access nodes 501, 502 over an X2 interface indicating the type of RAT or wireless communications protocol of the new or updated access node 503. Based on the received X2 message, neighboring access nodes 501, 502 may detect the new or updated access node 503 and note in their respective neighbor relation tables the type of RAT and/or wireless communication protocol of the new access node 503. The server 505 may monitor the neighbor relation tables of access nodes 501, 502. The server 505 may periodically monitor the neighbor relation tables of access nodes 501, 502, or during maintenance operations.

In response to the trigger, determined by server 505, the server 505 may update one or more preferred nodes lists for one or more wireless devices, which may be one or more relay nodes and/or end-user wireless devices. Server 505 may instruct an access node to send a message to a relay node and/or an end-user wireless device, to instruct the relay node and/or end-user wireless device to contact server 505 for the updated preferred nodes list. For example, when the trigger indicates that an access node has been added or updated, the server 505 may instruct access node 501, to which relay node 531 and/or end-user wireless device 541 is currently connected, to send a message to relay node 531 and/or end-user wireless device 541, instructing relay node 531 and/or end-user wireless device 541 to contact server 505 for an updated preferred nodes list.

The message sent by the access nodes to relay nodes and/or end-user wireless devices may be a modified RRC Connection Reconfiguration message, which may include a data bit, data field, or flag to indicate to the relay nodes and/or end-user wireless devices that an updated preferred nodes list is available at server 505. In some embodiments, the data bit, data field, or flag may force the relay nodes and/or end-user wireless devices to contact server 505 for an updated preferred nodes list. In some embodiments, the data bit, data field, or flag may instruct or cause the relay nodes and/or end-user wireless devices to contact server 505 for an updated preferred nodes list.

Referring to FIG. 7, server 505 may receive a request for the preferred nodes list from a wireless device (operation 730). For example, when the wireless device (e.g., relay node or end-user wireless device) receives the modified RRC Connection Reconfiguration message, the wireless device may contact server 505, and request for the updated preferred nodes list.

Server 505 may provide the updated preferred nodes list to the wireless device, the updated preferred nodes list enabling the wireless device to change from connecting to a first node included in the preferred nodes list to connecting to a second node included in the updated preferred nodes list (operation 740). For example, after receiving the request for the updated preferred nodes list from end-user wireless device 542, server 505 may provide a copy of the updated preferred nodes list to end-user wireless device 542, or allow end-user wireless device 542 to access the updated preferred nodes list stored at server 505. End-user wireless device 542 may update a local copy of the preferred nodes list stored at end-user wireless device 542 with the updated preferred nodes list obtained from server 505. End-user wireless device 542 may then select a new access node (other than access node 531 to which end-user wireless device 542 is currently connected) from the updated preferred nodes list, and initiate a process for connecting to the new access node.

As another example, after receiving the request for the updated preferred nodes list from relay node 531, server 505 may provide a copy of the updated preferred nodes list to relay node 531, or allow relay node 531 to access the updated preferred nodes list stored at server 505. Relay node 531 may update a local copy of the preferred nodes list stored at relay node 531 with the updated preferred nodes list obtained from server 505. Relay node 531 may select a new or updated access node (for example access node 503) from the updated preferred nodes list, and initiate a process for connecting to the new or updated access node 503.

In some embodiments, in response to receiving the updated preferred node list, the wireless device (e.g., relay node 531 or end-user wireless device 541, 542) may perform a re-scan detecting the RSRP or SINR of neighboring access nodes. The wireless device compares the RSRP or SINR of neighboring access nodes the RSRP or SINR of the access node currently serving the wireless device. Based on the comparison, the wireless device may change from the currently serving access node (e.g., access node 501) to the new or updated access node 503 having an RAT and/or communication protocol that is different from access node 501, 502. For example, the wireless device may determine the new or updated wireless device may have a better RSRP or SINR than the currently serving access node.

As a further example, the wireless device may determine the new or updated wireless device has a different RAT and/or communication protocol from the RAT and/or communication protocol of the serving access node. For example, the RAT and/or communication protocol of the serving access node may be based on a 4G LTE configuration, while the RAT and/or communication protocol of the new or updated access node may be based on a 5G configuration. The RATs and/or communications protocols may be determined from the updated preferred node list. The wireless device may determine to change from a currently serving access node to a new or updated wireless device based on the new or updated access node having a different RAT and/or communication protocol from the RAT and/or communication protocol of the serving access node.

As a further example, the wireless device may determine to change from a currently serving access node to a new or updated wireless device based on the new or updated access node having a different RAT and/or communication protocol from the RAT and/or communication protocol of the serving access node and a better RSRP or SINR than the currently serving access node.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for updating a preferred nodes list for a mobile device in a wireless network, the system comprising:
    a server in communication with a plurality of nodes each configured to deploy a radio air interface to provide wireless services to a plurality of mobile devices, the server comprising a processor configured to:
    monitor a neighbor relations table of the plurality of nodes;
    instruct, in response to a change in the neighbor relations table, a mobile device connected to a first node deploying a radio air interface using a first radio access technology (RAT) of the plurality of nodes to request an updated preferred nodes list from the server;
    receive the request for the updated preferred nodes list from the mobile device; an
    provide the updated preferred nodes list to the mobile device, the updated preferred nodes list enabling the mobile device to change from connecting to the first node included in the preferred nodes list to connecting to a second node included in the updated preferred nodes list, the second node deploying a radio air interface using a second RAT.

2. The system of claim 1, wherein the change in the neighbor relations table comprises a change in the nodes.

3. The system of claim 1, wherein the change in the neighbor relations table comprises detecting, by the server, the second access node is capable of serving as an 5G-NR access node.

4. The system of claim 3, wherein the server is further configured to receive a message from the first node indicating that a first reference signal provided by the first node to the mobile device is less than a second reference signal provided by the new access node.

5. The system of claim 3, wherein the server is further configured to receive a message from the first node indicating that a first signal-to-interference and noise ratio (SINR) for a first node is less than a second SINR for the new node.

6. The system of claim 3, wherein the server is further configured to receive a request from the first node for changing the mobile device to the new access node.

7. The system of claim 6, wherein the server is further configured to instruct the mobile wireless device connect to the new access node.

8. The system of claim 1, wherein the server is further configured to receive a message comprising a Radio Resource Control (RRC) Connection Reconfiguration message that contains an indicator instructing the mobile to contact the server for an updated preferred nodes list.

9. A method for updating a preferred nodes list for an mobile device in a wireless network, the method comprising:
    detecting, by a server, changes in the neighbor relations table;
    in response to the detection of the changes in the neighbor relations table, instructing, by the server, a mobile device connected to a first node of the plurality of nodes to contact the server for an updated preferred nodes list, the first node deploying a radio air interface using a first radio access technology (RAT);
    receiving, by the server, a request for the updated preferred nodes list from the mobile device; and
    providing, by the server, the updated preferred nodes list to the mobile device, the updated preferred nodes list enabling the mobile device to change from connecting to the first node included in the preferred nodes list to connecting to a second node included in the updated preferred nodes list, the second node deploying a radio air interface using a second RAT.

10. The method of claim 9, wherein the second node is a 5G-NR access node.

11. The method of claim 10, wherein the detecting changes in the nodes comprise detecting the 5G-NR access node has been enabled.

12. The method of claim 9, wherein the changes in the nodes comprise detecting an 5G-NR access node has been added to the network.

13. The method of claim 9, wherein the nodes including the first node and the second node are access nodes, the mobile devices comprise relay nodes connected to the access nodes through a backhaul, and the relay nodes serve a plurality of end-user wireless devices.

14. The method of claim 9, wherein the nodes including the first node and the second node are relay nodes, and the mobile devices comprise end-user wireless devices connected to an access node through the relay nodes.

15. The method of claim 9, wherein the server is further configured to receive a message comprising a Radio Resource Control Connection Reconfiguration message that contains an indicator instructing the mobile devices to contact the server for an updated preferred nodes list.

16. A method for updating a preferred nodes list for a mobile device in a wireless network, the method comprising:
    receiving, at a mobile device, instructions to request an updated preferred nodes list, the instructions being received from an access node communicating with the mobile device;
    transmitting a request for the updated preferred nodes list;
    receiving the updated preferred node list;
    detecting nodes listed in the updated preferred nodes list; and
    connecting the mobile device to a detected node in response to the detected node being a 5G-NR access node.

17. The method of claim 16, wherein the criteria further comprises determining, by the mobile device, a signal to interference and noise ratio (SINR) of the 5G-NR access node is greater than an SINR of the access node.

18. The method of claim 16, wherein the criteria further comprises determining, by the mobile device, a reference signal received power (RSRP) of the 5G-NR access node is greater than an RSRP value of the access node.

* * * * *